United States Patent [19]

Barabas et al.

[11] 3,862,091

[45] Jan. 21, 1975

[54] QUATERNIZED N-VINYL LACTAM POLYMERIC COMPOSITIONS AND MANNICH ADDUCTS THEREOF

[75] Inventors: Eugene S. Barabas, Watchung; Frederick Grosser, Midland Park, both of N.J.

[73] Assignee: GAF Corporation, New York, N.Y.

[22] Filed: Mar. 7, 1972

[21] Appl. No.: 232,612

[52] U.S. Cl. ...... 260/73 L, 260/78.5 B, 260/79.3 M, 260/80.3 N, 260/80.72
[51] Int. Cl. .................. C08f 19/00, C08f 27/08
[58] Field of Search .......... 260/73 L, 80.3 N, 80.72

[56] References Cited
UNITED STATES PATENTS 2,923,701  2/1960  Schuller et al. .................... 260/85.5
3,544,318  12/1970  Boothe et al. ........................ 96/1.5

*Primary Examiner*—Stanford M. Levin
*Attorney, Agent, or Firm*—Walter C. Kehm; Samson B. Leavitt

[57] ABSTRACT

A composition comprising

A. the polymeric reaction product of the polymerization of a mixture of monomers comprising
1. 20–80 mole percent of a quaternary ammonium compound represented by the formula

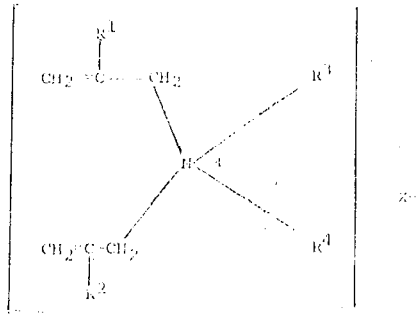

wherein $R^1$ and $R^2$ are selected from the group consisting of hydrogen, methyl and ethyl radicals; $R^3$ and $R^4$ each represent a $C_{1-6}$ alkyl group, and X represents an anion,
2. 80–20 mole percent of an N-vinyl lactam monomer, and
3. 0–20 mole percent of another ethylenically unsaturated monomer; a Mannich Adduct thereof and methods of preparation.

7 Claims, No Drawings

QUATERNIZED N-VINYL LACTAM POLYMERIC COMPOSITIONS AND MANNICH ADDUCTS THEREOF

BACKGROUND OF THE INVENTION

This invention relates broadly to new and useful copolymer compositions, and more particularly to compositions comprising a linear copolymer produced by polymerization of a mixture of copolymerizable ingredients including essentially a quaternary ammonium compound containing two unsaturated groupings each having a terminal

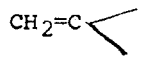

radical operative to undergo ring closure during polymerization. The invention is especially directed to such compositions obtained by polymerization of a mixture of copolymerizable ingredients including (1) a quaternary compound represented by the general formula:

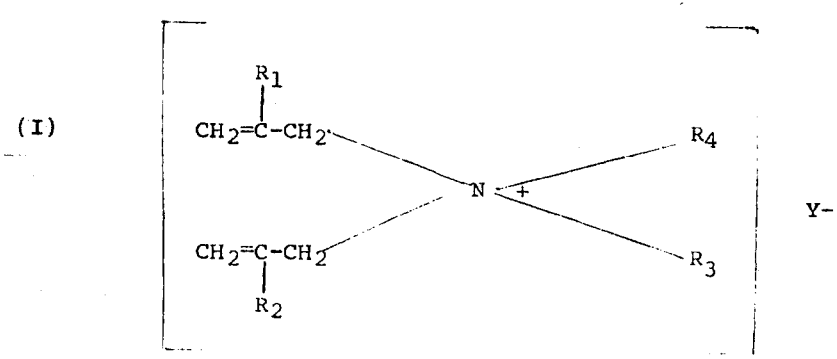

wherein $R_1$ and $R_2$ may be hydrogen or $C_{1-4}$ alkyl, and $R_3$ and $R_4$ are $C_{1-4}$ alkyl groups, while Y can be halide, sulfate or another anion, and (2) an N-vinyl lactam and (3) optionally at least one other monomer which is different from either of the foregoing two monomers, yet is copolymerizable therewith and contains a single $CH_2=C$ grouping. A further variation employs the Mannich Adduct and transforms the polymer containing all three monomeric groups into a secondary amine.

The homopolymerization of a quaternary ammonium salt such as diallyl dialkyl ammonium chloride is known, as is the copolymerization of such a monomer with certain vinyl monomers (see U.S.P. 3,288,770 and 2,923,701). It has not, however, been possible to copolymerize an N-vinyl lactam with this particular preferred quaternary ammonium salt or to copolymerize said two monomers with a third and different monomer, such as a vinyl monomer. The monomers herein may be simultaneously polymerized and quaternized and optionally the already quaternized copolymer may then be further transformed to a secondary amine in accordance with the Mannich Adduct.

Moreover, the use of this preferred quaternary ammonium salt monomer has not been known to be operative to lower the viscosity of a copolymer system.

SUMMARY OF THE INVENTION

It is an object of the instant invention to avoid one or more drawbacks of the prior art.

It is another object of the present invention to supply a copolymer of the aforementioned composition which is stable and has improved properties such as water-solubility, high molecular weight, and one which is useful as a flocculating agent for improving the rate of sediment and filtration of finely-divided solids from aqueous suspensions.

It is a further object of the invention to provide a novel copolymer which may be employed either alone or in conjunction with other water-soluble polymers for settling mineral solids, improving the filterability of sewage sludge and for increasing pigment retention in the manufacture of paper.

It is yet a further object of the instant invention to provide a novel copolymer which has a low Brookfield viscosity.

Other objects and advantages will appear as the description proceeds.

Broadly speaking, the attainment of the above objects is made possible by this invention which includes the provisions of a novel composition comprising A. the polymeric reaction product of the polymerization of a mixture of monomers comprising 1. 20–80 mole percent of a quaternary ammonium compound represented by the formula

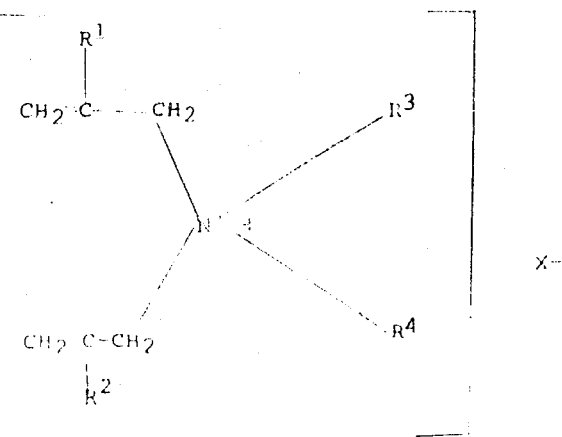

wherein $R^1$ and $R^2$ are selected from the group consisting of hydrogen, methyl and ethyl radicals; $R^3$ and $R^4$ each represent a $C_{1-6}$ alkyl group, and X represents an anion, 2. 80–20 mole percent of an N-vinyl lactam monomer, and 3. 0–20 mole percent of another ethylenically unsaturated monomer. There is also provided a Mannich Adduct which, broadly speaking, is the reaction product of about 1–20 mole percent of a mixture of a $C_{1-8}$ secondary amine and formaldehyde with a composition as defined above wherein component (3) is present in amounts of about 0.1–20 mole percent.

The copolymers of the present invention are conveniently prepared by subjecting a solution of N-vinyl lactam, such as N-vinyl pyrrolidone and the quaternary ammonium compound with or without the optional copolymerizable ethylenically unsaturated monomer to conditions conducive to vinyl polymerization through the double bond. Thus, for example, polymerization can be suitably initiated by the action of free radicals, the polymerization proceeding exothermically once initiated.

The polymers of the present invention are soluble in both water and alcohol and can be prepared in various molecular weight ranges depending upon the reactants, catalyst, solvent and conditions employed. As is indicated above, copolymers can be prepared either by the copolymerization of an N-vinyl lactam with a quaternary ammonium compound such as a diallyl dialkyl ammonium halide which undergoes ring closure during the polymerization or the two foregoing monomers can be simultaneously polymerized with a third and different ethylenically unsaturated monomer. The optional third monomer may be initially included with the first two monomers and the polymerization reaction commenced or later added to the initially formed copolymer. The monomers are copolymerized in accordance with the present invention so that based upon the 100 mole percent, the N-vinyl lactam units are present in an amount of about 20 to about 80 percent and the quaternary ammonium compound in amounts of about 80 to 20 percent. The optional third ethylenically unsaturated monomer, when employed, may range from amounts of about 0 to about 20 percent, with a corresponding reduction in the amounts of the other two monomers.

Exemplary N-vinyl lactams and water-soluble polymers thereof, and methods for their production are well known in the art. Thus, for example, U.S. Pat. No. 2,317,804 discloses a suitable method for preparing N-vinyl lactams and U.S. Pat. Nos. 2,215,450 and 2,335,454 disclose methods for preparing water-soluble polymers thereof and aqueous solutions containing the same. As examples of N-vinyl lactams which may be employed in producing in known manner the operative aqueous solutions of water-soluble polymers thereof, there may be mentioned the N-vinyl derivatives of gamma-, delta-, and epsilon-lactams (N-vinyl derivatives of the cyclic amides of gamma-, delta-, and epsilon aminocarboxylic acids of the aliphatic series) and lower alkyl (methyl, ethyl) substituted derivatives of such N-vinyl lactams. Among this group, N-vinyl-2-pyrrolidone (otherwise referred to as I-vinyl-2-pyrrolidone, N-vinyl-α-pyrrolidone) is preferred. As illustrative of other N-vinyl lactams within this group, there may be mentioned N-vinyl-2-piperidone, N-vinyl-6-caprolactam, N-vinyl-5-methyl-2-pyrrolidone, N-vinyl-3, 3-dimethyl-2-pyrrolidone, and the like.

The term "ethylenically unsaturated monomer" is meant to include the vinyl esters such as vinyl acetate, vinyl butyrate, other fatty acid vinyl esters, vinyl alkyl sulfonates, and the like; vinyl ethers such as vinyl ethyl ether, vinyl isopropyl ether, and the like; monomers such as diethyl maleate, diethyl fumarate and the like. Acrylate esters such as methyl, ethyl, propyl, isopropyl, butyl, isobutyl, s-butyl, 2-methyl-1-butyl, 3-methyl-1-butyl, 2-ethyl-1-butyl, amyl, 3-methyl, hexyl, 2-ethylhexyl, heptyl, 2-heptyl, octyl, 2-octyl, 2-methoxyethyl, 2-ethoxyethyl and 2-butoxy-ethyl acrylate; methacrylic monomers such as methyl methacrylate, isobutyl methacrylate, isoamyl methacrylate, B-methoxy ethyl methacrylate and diethylamino-ethyl methacrylate, and glycidyl methacrylate, methacrylonitrile, acrylonitrile and acrylamide; N-alkyl and N-aryl substituted acrylamides such as N-methyl acrylamide, N,N-dimethyl acrylamide, N,N-diethyl acrylamide, N,N-di-n-butyl acrylamide, N,N-di-isobutyl acrylamide, and grafted monomers of the type disclosed in U.S. Pat. Nos. 3,029,219, 3,035,009, 3,036,033 and the like.

Exemplary di-lower alkylamino alkyl- (or hydroxyalkyl-) acrylate or methacrylates suitably employed include such materials as: dimethylaminomethyl acrylate, methylethylaminomethyl acrylate, dimethylaminomethyl methacrylate, diethylaminoethyl acryalte, diethylaminoethyl methacrylate, dimethylaminoethyl acrylate, methylethylaminoethyl methacrylate, dimethylamino-2-hydroxypropyl acrylate, dimethylamino-2-hydroxypropyl methacrylate, diethylamino-2-hydroxyethyl acrylate, etc.

The use of $C_{1-8}$, preferably $C_{1-5}$, secondary amines in the Mannich Adduct may be illustrated by the following group: dimethylamine, diethylamine, diethanolamine, dipropylamine, di-n-butylamine, piperidine, morpholine, piperazine, pyrole.

The free radical-supplying redox polymerization catalysts useful in the present process are well known in the art. Most of these catalysts are compounds yielding oxygen under the conditions of polymerization, as represented by the compounds having —O—O—or—N—N=linkage, i.e., inorganic and organic peroxygen or peroxide compounds. As examples of such compounds, there may be mentioned hydrogen peroxide, metal and alkali metal peroxides such as sodium, potassium, barium and zinc peroxide, diacyl peroxides such as diacetyl, debenzoyl and dilauroyl peroxide, dialkyl peroxides such as di-teritiary-butyl peroxide and cyclohexene peroxide, hydroperoxides such as tertiary-butyl hydroperoxide and p-methane hydroperoxide, peroxygen acids such as perfomic, persulfuric and peracetic acid and their ammonium, sodium and potassium salts, in addition to systems such as potassium or ammonium persulfatesodium bisulfite and mixtures.

Azo type catalysts, i.e., compounds containing the azo linkage, may also be employed. As example of such catalysts, there may be mentioned a,a'-azobis-(a,γ-dimethylvaleronitrile), a,a'-azobis-(a-methyl butyronitrile), a,a'azodiisobutyramide, dimethyl and diethyl, a,a'-azobis-isobutyrate, and the like.

DETAILED DESCRIPTION

The mixture of monomers in the presence of a suitable catalyst can be polymerized in emulsion or solution to yield a linear copolymer. Good results are obtained, however, by carrying out the copolymerization while the monomers are dissolved in a suitable solvent, preferably water or liquid solvent comprising mainly water. Suitable inert solvents also can be used advantageously in some cases, e.g., benzene, toluene, xylene, various di (lower alkyl) ketones, etc. The polymerization reaction is preferably conducted under a blanket of inert gas, e.g., nitrogen gas or the like.

Temperature at which the monomers are copolymerized can be varied considerably, but in most cases the polymerization temperature will be within the range of about 30° to about 150°C or higher, preferably about 60° to about 90°C. Considerations such as the boiling temperature of the mixture of monomers, the particular catalyst and the rapidity of polymerization desired are other influencing factors.

The copolymerization can be carried out continuously, semi-continuously or by batch operation for a sufficient period of time to substantially effect copolymerization. It can be effected under superatmospheric pressure if desired or required.

For producing a co or terpolymer in accordance with the instant invention, part of the monomeric mixture should be added and stirred until a uniform solution is formed, whereupon the system should be thoroughly purged with nitrogen or other inert gas. Into a graduated dropping funnel there should be added additonal water and the remainder of the monomers. The temperature should then be increased to the point where the exotherm starts, whereupon the mixture is cooled. The temperature should then be allowed to drop, at which point the contents of the dropping funnel should slowly be added. After the complete mixture has substantially reacted at the lower temperature, the polymerization is finished by further additions of catalyst. It is preferred that the monomeric mixture be mixed with the catalyst or initiator in amounts of about 0.0001 to about 5.0 weight percent, preferably 0.05 to about 1.0, in the presence of water as a solvent, and the mixture thereafter heated at temperatures of from about 60° to about 90°C until the desired extent of polymerization is obtained.

If the third monomer is, for instance, an acrylamide, the Mannich Adduct may be formed, in which case the polymer will contain both tertiary and quaternary ammonium groups with an accompanying increase in charge density along the polymer chain.

The Mannich Adduct consists essentially in the condensation of ammonia or a primary or secondary amine, usually as the hydrochloride, with formaldehyde in about equimolar proportions or more amine, and a compound containing at least one hydrogen atom of pronounced activity such as in one of said ethylenically unsaturated monomers. The essential feature of the reaction is the replacement of the active hydrogen of the latter by an aminomethyl or substituted aminomethyl group. If the substances used in the condensation contain reactive hydrogen atoms on two or more different carbon atoms, then substituted aminomethyl groups may appear at different points in the molecule, leading to a mixture of isomers.

The amount of mixture of secondary amine and formaldehyde to ethylenically unsaturated monomer may vary; it may be equimolar so as to result in full replacement of said active hydrogen or less, thereby yielding a quaternized polymer not having all active hydrogen of the third monomer replaced. (Reference is had to "Organic Reactions", Volume I, John Wiley & Sons, Inc., New York 1942, Pages 303-330.)

As indicated above, the monomeric components are polymerized such that on a molar basis, the polymer contains 20-80 mole percent of N-vinyl lactam preferably, 50-70 mole percent thereof, 20-80 mole percent of the dialkyl diallyl ammonium compound, preferably, 20-30 mole percent thereof, and optionally 0-20, preferably 5-10 mole percent of a third and different vinyl monomer capable of being copolymerized with the aforesaid two monomers.

The novel copolymers of the present invention are obtained by the above described solution polymerization techniques as high molecular weight materials having a relatively low viscosity. In this regard, the copolymers produced in accordance with the present invention are generally those having a Finkentscher K value within the range of 12 to 100 and more particularly within the range of 18 to 40 which corresponds approximately to a molecular weight within the range of 2,000 to 500,000, more particularly, within the range of 18,000 to 70,000. Such copolymers in the form of their quarternary salts are eminently useful alone or in conjunction with other water-soluble polymers for settling mineral solids, improving the filterability of sewage sludge, increasing pigment retention in the manufacture of paper, as a dye-receptor, as a photo-chemical additive, etc. A terpolymer of for example, vinyl pyrrolidone, an acrylamide, and dially dimethyl ammonium chloride is an especially effective flocculant.

The molecular weight of the copolymers of the present invention can be varied depending upon the particular choice of reactants, catalyst, solvent and polymerization conditions the lower temperatures being conducive to the formation of high molecular weight polymers.

In the preparation of the novel copolymers of the present invention it is only necessary to mix the monomers in the ratios set forth above in order to provide a product produced through vinyl polymerization initiated by the action of free radicals. Generally, the copolymer is produced in a period of approximately one-half to 30 hours.

In order that those skilled in the art may better understand how the present invention can be carried into effect, the following examples are given by way of illustration only and not by way of limitation. All parts and proportions herein and in the appended claims are by weight unless otherwise stated.

EXAMPLE I

To a 1 liter resin kettle equipped with mechanical stirrer, reflux condenser, thermometer, gas inlet tube and graduated dropping funnel, there is charged 298 gm. distilled water, 63 gm. N-vinyl-2-pyrrolidone, 16.2 gm. acrylamide, 22 gr. diallyl dimethyl ammonium chloride (50percent solution) and 0.3 gm. t-butyl peroxypivalate. The mixture is stirred until uniform and the system is thoroughly purged with nitrogen.

To a closed graduated dropping funnel there is added a solution containing 33 gm. distilled water, 42 gm. N-vinyl-2-pyrrolidone, 10.8 gm. acrylamide, 14.7 gm. diallyl dimethyl ammonium chloride. The temperature of the kettle containing the first described mixture is increased to 60°C, while keeping the funnel closed. At 60°C, an exothermic reaction starts which with ice cooling peaks at 70°C. The temperature is thereafter lowered to 60°C, at which point the contents of the dropping funnel are added over a period of 20 minutes. The mixture is then allowed to react at 60°C, and the polymerization finished by further additions of 0.3 gm. t-butyl peroxypivalate catalyst.

EXAMPLE II

Apparatus: as described in Example I.
Procedure: 18 gm. dimethylamine (40 percent) are placed in a beaker surrounded by an ice-bath, 13 gm. of a 37 percent formaldehyde solution are then added dropwise, thereto forming component I. Into a separate reaction kettle there is placed 280 gm. of the copolymer solution prepared in Example I. The Mannich-mixture just prepared (I), is then added to the copolymer of Example I over a period of 15 minutes while maintaining the temperature at 25°C. The temperature is then increased to 65°C. and maintained for 2 hours. The mixture is then cooled to room temperature and the product, a dimethyl-amino methylene derivative of the terpolymer discharged.

EXAMPLE III

Apparatus: as described in Example I.
Procedure: 52 gm. distilled water, 55.5 gm. N-vinyl-2 pyrrolidone and 154.3 gm. of a 50 percent solution of dimethyl diallyl ammonium chloride are charged into a kettle. 0.36 gm. t-butylperoxy pivalate, are added and the system is purged with nitrogen. The temperature increases to 80°C, and it is maintained for 2 hours. At this point 0.36 gm. catalyst are added again, the mixture is stirred at 80°C for one more hour, and the solution is cooled and discharged.

EXAMPLE IV

Apparatus: as described in Example I.
Procedure: 400 gm. distilled water, 56.0 gm. N-vinyl-2-pyrrolidone and 24.0 gm. dimethylaminoethyl methacrylate is placed in a kettle. A 50 percent solution of dimethyl diallyl ammonium chloride (160 gm.) is added together with 1.0 gm. azo-bis-isobutyronitrile. The system is purged with nitrogen and the temperature raised to 80°C.

A mixture of 240.0 gm. dimethyl diallyl ammonium chloride, 94.0 gm. N-vinyl-2-pyrrolidone and 36.0 gm. dimethylamino-ethyl methacrylate are placed in a dropping funnel. The contents of the kettle are kept at 80°C for 15 minutes. After which the addition of the contents of the dropping funnel is started and is added over a period of 1 hour. After which the addition of the catalyst is repeated, the solution stirred for an additional hour, cooled to room temperature, and discharged.

Having thus claimed our invention, what we claim as new and novel and wish to be secured by Letters Patent is as follows:

1. A composition comprising
   A. the linear copolymer having a molecular weight within the range of 2,000 to 500,000 a mixture of monomers comprising
      1. 20–80 mole percent of a quaternary ammonium compound represented by the formula

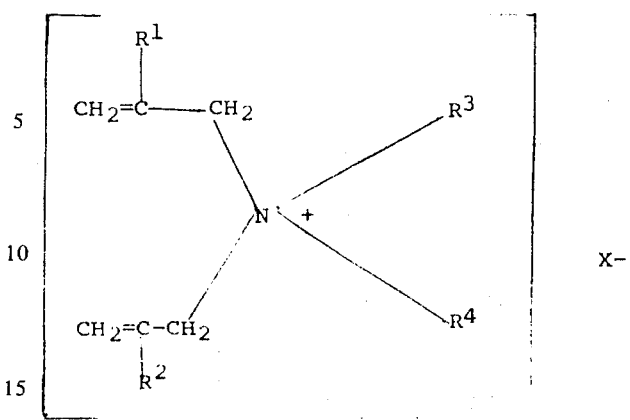

wherein $R^1$ and $R^2$ are selected from the group consisting of hydrogen, methyl and ethyl radicals; $R^3$ and $R^4$ each represent a $C_{1-6}$ alkyl group, and X represents an anion, 2. 80–20 mole percent of an N-vinyl lactam monomer; and
   3. 0–20 mole percent of another ethylenically unsaturated monomer.

2. The reaction product of about 0.1–20 mole percent of a mixture of a $C_{1-8}$ secondary amine and formaldehyde with a composition as defined in claim 1 wherein component (3) is present in amounts of about 0.1–20 mole percent.

3. A composition as defined in claim 1 wherein said component (1) is diallyl dimethyl ammonium chloride.

4. A composition as defined in claim 1 wherein said component (2) is N-vinyl pyrrolidone.

5. A composition as defined in claim 1 wherein component (3) is present in proportions of about 0.5–20 mole percent and is selected from the group consisting of alkyl vinyl ethers, acrylate esters methacrylate esters and alkyl and aryl substituted acrylamides.

6. A composition as defined in claim 5 wherein component (3) is acrylamide.

7. A composition as defined in claim 5 wherein said acrylate esters are selected from the group consisting of methyl, ethyl, propyl, isopropyl, butyl, isobutyl, s-butyl, 2-methyl-1-butyl, 3-methyl-1-butyl, 2-ethyl-1-butyl, amyl 3-methyl, hexyl, 2-ethylhexyl, heptyl, 2-heptyl, octyl 2-octyl, 2-methoxyethyl, 2-ethoxyethyl, 2-butoxy-ethyl acrylate, dimethylaminomethyl acrylate, methylethylaminomethyl acrylate, diethylaminoethyl acrylate, dimethylaminoethyl acrylate, diemethylamino-2-hydroxypropyl acrylate and diethylamino-2-hydroxyethyl acrylate, said methacrylate esters are selected from the group consisting of methyl methacrylate, isobutyl methacrylate, isoamyl methacrylate, β-methoxy ethyl methacrylate, diethylamino-ethyl methacrylate, glycidyl methacrylate, dimethylaminomethyl methacrylate, diethylaminoethyl methacrylate, methylethylaminoethyl methacrylate, dimethylamino-2-hydroxypropyl methacrylate and said acrylamides are selected from the group consisting of N-methyl acrylamide, N,N-dimethyl acrylamide, N,N-diethyl acrylamide, N,N-di-n-butyl acrylamide and N,N-di-isobutyl acrylamide.

* * * * *